April 8, 1952 T. M. BALL 2,592,375
THROTTLE CONTROL

Filed Jan. 26, 1946 3 Sheets-Sheet 1

INVENTOR.
Thomas M. Ball.
BY
Harness and Harris
ATTORNEYS.

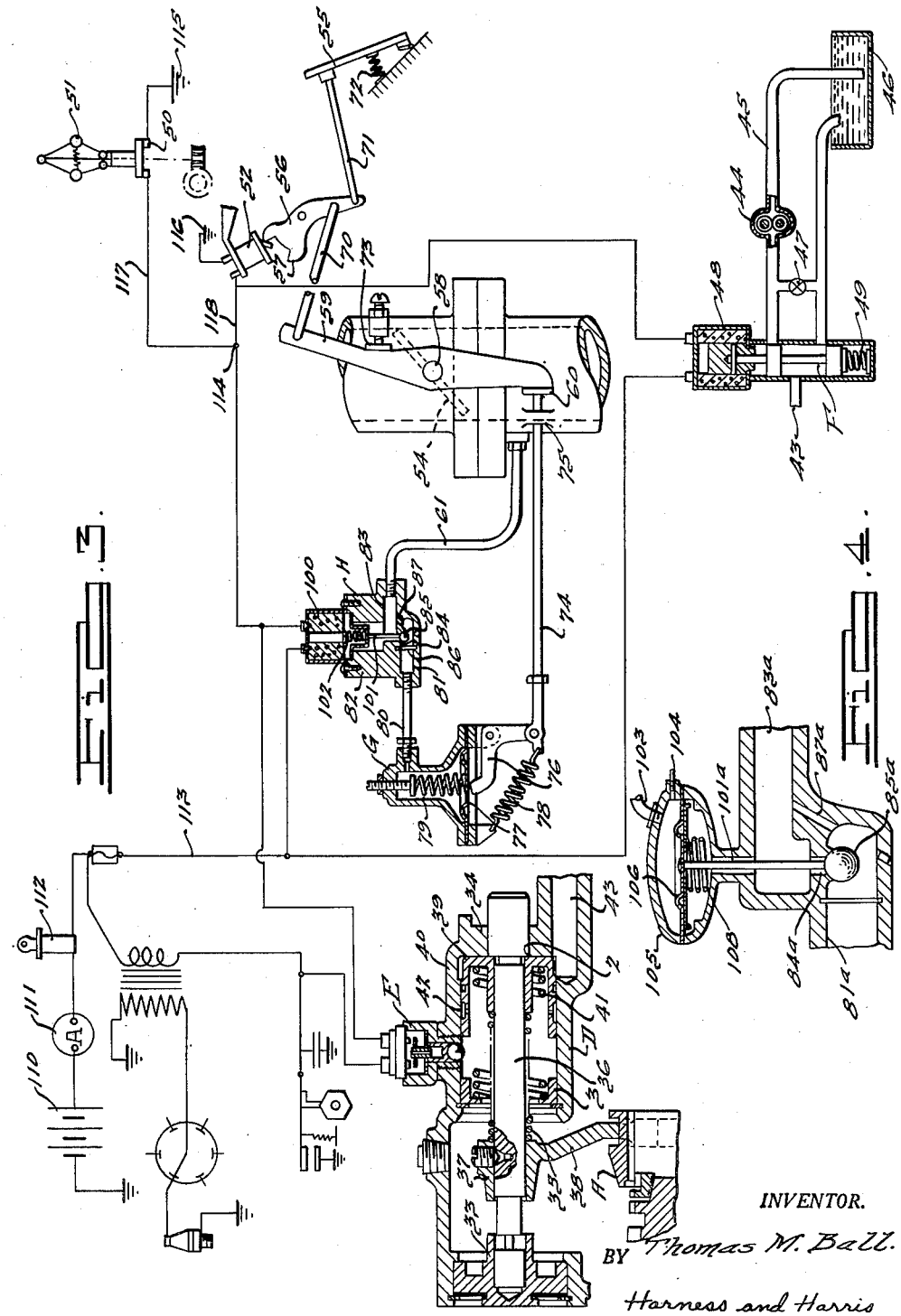

April 8, 1952

T. M. BALL 2,592,375

THROTTLE CONTROL

Filed Jan. 26, 1946

INVENTOR.
Thomas M. Ball.
BY
Harness and Harris
ATTORNEYS.

UNITED STATES PATENT OFFICE 2,592,375

THROTTLE CONTROL

Thomas M. Ball, Detroit, Mich., assignor to Chrysler Corporation, Highland Park, Mich., a corporation of Delaware Application January 26, 1946, Serial No. 643,819

31 Claims. (Cl. 74—472)

This invention relates to devices controlling the throttle on internal combustion engines.

While my control may be employed in conjunction with various mechanisms I am describing my invention in relation to an automobile transmission in which speed ratio change occurs in response to engine speed reduction.

It is well known that certain automotive transmissions are equipped with automatic means for changing speed ratio drive between engine and vehicle. Some automotive engines are also equipped with carburetor control mechanisms adapted to overcome the tendency of an engine to stall at reduced speeds. The current use of a fluid coupling through which the drive is taken accentuates the tendency to stall. It has been found that the mechanisms to overcome the tendency to stall are at times detrimental when used in conjunction with the automatic transmissions. At substantial vehicle speeds the delay in the closing of the throttle caused by the carburetor control mechanism is undesirable because the delay does not permit effective use of the engine as a brake and the automatic transmission upshift is retarded. In the automatic transmission system to be described herein an upshift is initiated by a release of the accelerator pedal by the driver above a predetermined vehicle speed.

The transmission upshift cannot occur until the positively interengageable drive control elements are brought to substantially the same speed at which time such elements are interengaged under synchronous conditions. This synchronous condition is brought about by a reduction in the speed of the engine-connected drive control element as the engine is allowed to coast down under closed throttle conditions while the other drive control element continues to rotate at substantially constant speed during such engine coast. In well known types of automatic overdrives, engine coast brings one of the drive control elements down to approximately zero rotation to establish the synchronous relationship preparatory to interengagement of the drive control elements which are in the form of a pawl and slotted sun gear member.

The throttle control mechanism is desirable at low engine speeds to prevent stalling but is undesirable during transmission upshifts.

It is an object of this invention to provide automatic means for eliminating the operation of a throttle control device responsive to differential pressure under conditions when its operation would be undesirable.

It is also an object of this invention to render a differential pressure responsive device for preventing engine stalling inoperative under all conditions when a transmission upshift might be effected.

A further object of this invention is to decrease the time required for a speed ratio change to occur in a transmission actuated by hydraulic controls.

An additional object is to protect the control mechanism adapted to prevent engine stall from unnecessary operation thereby reducing the wear on its component parts.

The means for eliminating the operation of the throttle control may be made to operate as a function of engine speed or vehicle speed.

Fig. 4 is a modified form of the invention; and

Fig. 5 shows a modified construction of my invention which is responsive to engine speed rather than vehicle speed.

Figure 1:
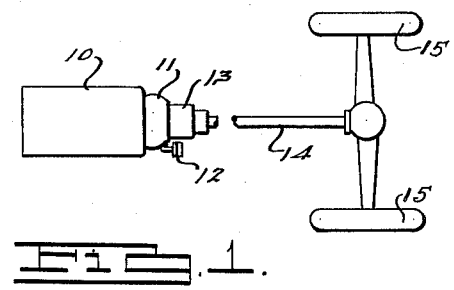
Fig. 1 is a diagrammatic plan view of the power plant of an automotive vehicle.

In Fig. 1, engine 10 drives the vehicle's rear wheels 15 through a fluid coupling and friction clutch 11, transmission 13, and drive shaft 14. A foot pedal 12 actuates the friction clutch.

Figure 2:
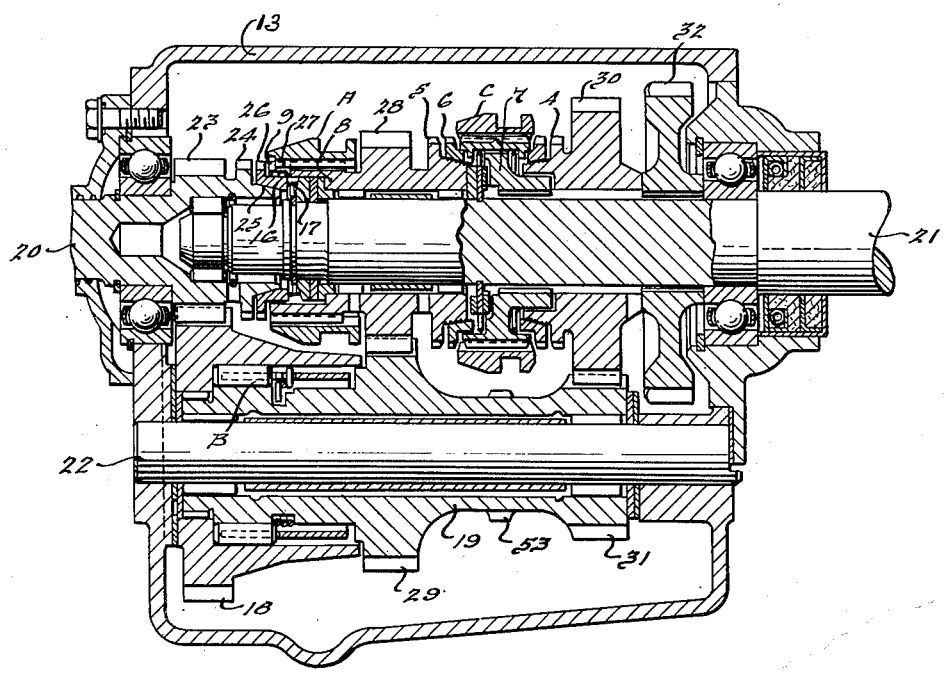
Fig. 2 is a longitudinal sectional elevation of an automatic transmission.

The transmission 13 is illustrated in more detail in Fig. 2. The transmission comprises an input shaft 20, an output shaft 21, a fixed countershaft 22, and a countershaft gear cluster 19 rotatably mounted on the countershaft. Input pinion 23 carries clutch teeth 24 and friction cone 25 constantly engaged by the blocker 16. The blocker carries blocker teeth 26 adapted to be engaged by the teeth 27 of clutch sleeve A when the latter is biased forwardly under synchronous conditions in the rotation of pinion 23 and sleeve A. This sleeve together with clutch teeth 24 comprise relatively movable drive control elements for effecting step-up and step-down manipulation of the transmission.

Blocker 16 is lightly urged against the cone 25 by a spring 17 and has a lost-motion connection at 9 with the slotted end of a hub 8 of a high speed gear 28 such that the blocker may move relative to sleeve A between two positions blocking the sleeve, such positions being known as drive block and coast block depending on whether pinion 23 appreciably leads or lags the speed of the sleeve. The sleeve A is splined on hub 8 at 27, the arrangement being such that whenever sleeve A is rotating faster or slower than pinion 23 then the blocker teeth 26 will be aligned with the ends of the teeth of sleeve A and thus prevent shift of the sleeve into contact with teeth 24. However, when the pinion 23 is rotating faster than sleeve A and gear 28 and the sleeve is biased forwardly into blocked position, a reduction of engine speed will cause shaft 20 and pinion 23 to slow down and as the pinion and sleeve pass through a synchronous relationship the blocker is moved from its drive blocking position toward its coast blocking position and when mid-way will unblock the sleeve and allow teeth 27 to pass between the blocker teeth and clutch with teeth 24.

Gear 28 is loosely mounted on output shaft 21 but keyed to clutch sleeve A and in constant engagement with countershaft cluster gear 29. Therefore, countershaft cluster 19 may be power driven from gear 28 if sleeve A is engaged with teeth 24. If sleeve A is urged to the right in Fig. 2 by the mechanism shown in Fig. 3 and disengaged from teeth 24, the power drive of the countershaft cluster 19 occurs through pinion 23, gear 18 and overrunning clutch B.

A manually operated clutch C is adapted to either lock gear 28 to the driven shaft 21 or lock gear 30 to the driven shaft 21. Gear 30 is in constant engagement with countershaft cluster gear 31. A reverse gear 32 is illustrated.

The manually operated clutch C has a splined connection with a hub 7 fixed to shaft 21. There is associated with clutch C any commercial type of blocker synchronizers 6 such that clutch C may be shifted either forwardly to high range or rearwardly to low range to synchronously clutch shaft 21 either with the high speed gear 28 at the teeth 5 or with the low speed gear 30 at the teeth 4. Manual shifts of clutch C are facilitated by release of the main clutch at 11 by reason of the usual clutch pedal 12.

There are four forward speeds which may be obtained from this transmission. The first two speeds occur when clutch C is shifted to the right in Fig. 2:

(a) A first speed when sleeve A is disengaged from teeth 24 and manual clutch C is locking gear 30 to output shaft 21. The drive then occurs through pinion 23, gear 18, overrunning clutch B, countershaft cluster 19, gear 31, gear 30, and output shaft 21.

(b) A second speed when sleeve A is in engagement with teeth 24 and manual clutch C is locking gear 30 to output shaft 21. The drive then occurs through teeth 24, sleeve A, gear 28, gear 29, countershaft cluster 19, gear 31, gear 30, and output shaft 21.

If manual clutch C is shifted to the left in Fig. 2:

(c) A third speed when sleeve A is disengaged from teeth 24 and manual clutch C is locking gear 28 to output shaft 21. The drive then occurs through pinion 23, gear 18, overrunning clutch B, countershaft cluster 19, gear 29, gear 28, and output shaft 21.

(d) A fourth speed when sleeve A is in engagement with teeth 24 and manual clutch C is locking gear 28 to output shaft 21. The drive then occurs through teeth 24, sleeve A, gear 28, and through clutch C to output shaft 21.

It should be noted that the engagement of sleeve A with teeth 24 through the blocker device 16 is dependent upon synchronizing the speeds of rotation of gear 24 and sleeve A. Throttle control is directly related to the length of time required for synchronization.

Figure 3:
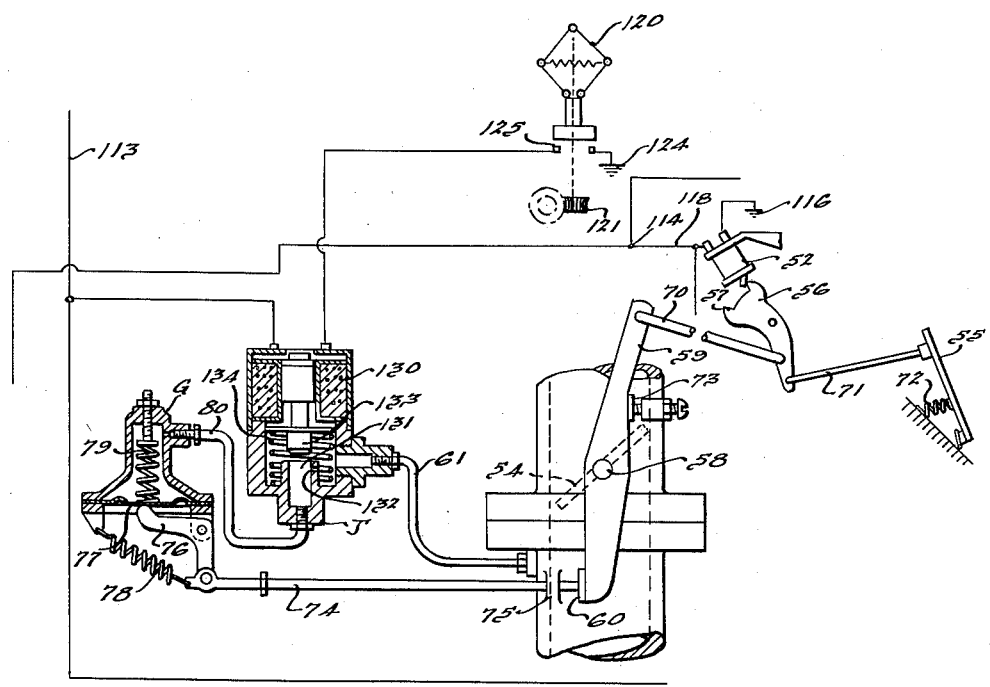
Fig. 3 is a diagrammatic view of the control mechanism for the Fig. 2 transmission showing one form of my invention.

Fig. 3 illustrates automatic means for urging sleeve A into or out of engagement with teeth 24 as discussed above and thereby accomplishing an automatic selection between the first and second or third and fourth speeds (depending upon the position of manual clutch C) listed above. Fluid motor D controls shift of sleeve A. This motor comprises a cylinder 40 slidably receiving a piston 39 which slidably receives a rod 36 which is mounted to reciprocate in guideways 33 and 34. Fixed to this rod is the collar 37 of a yoke 38 connected with sleeve A to effect shift thereof. A relatively small force pre-loaded engaging spring 35 is disposed between piston 39 and yoke 38 to provide a lost motion thrust transmitting connection such that piston 39 may move forwardly or to the left for its power stroke limited by abutment 3 in advance of the full clutching shift of sleeve A limited by engagement of the yoke collar 37 with the rear end of guideway 33. A relatively large force pre-loaded kickdown spring 41 is disposed between abutment 3 and piston 39 and serves to return the piston and sleeve A to the Fig. 3 position. The spring 41 is thus adapted to effect disengaging bias of sleeve A relative to teeth 24.

Rod 36 has a shoulder 2 which in Fig. 3 engages the face of piston 39 but which, when the piston and rod 36 are moved to the end of their forward strokes, is spaced rearwardly of the piston to provide a gap equal to the difference in the strokes of the piston and rod. This gap is utilized to close an ignition control switch E for interrupting the engine ignition system. Piston 39 is provided with an annular groove 42 formed in its skirt to define a cam surface which operates switch E. Switch E interrupts the engine ignition to unload torque long enough to permit a disengagement of sleeve A from teeth 24.

The pressure fluid supply system is connected with the servo motor D by passage 43 which is connected to valve F. Pump 44 through tubing 45 draws oil from source 46. Pump 44 may be driven from some moving part preferably car speed responsive such as gear 53 on countershaft cluster 19. Pressure relief valve 47 permits the return of oil to source 46 when the passage is blocked by valve F. When valve F is raised above its Fig. 3 position passage 43 is connected to the oil pressure and piston 39 is moved. Solenoid 48, when energized raises valve F above its Fig. 3 position against the force of spring 49.

Two parallel switches control the energizing of solenoid 48 which is electrically connected to the usual grounded storage battery 110 as illustrated in Fig. 3. Switch 50 is opened by governor 51 driven at 53 (Fig. 2) when sufficient vehicle speed is obtained. Switch 52 is manually closed by depressing the accelerator pedal. The last portion of travel in depressing accelerator pedal 55 closes switch 52. Electrical circuit means for this purpose includes the grounded storage battery 110 for supply of electrical energy through ammeter 111, ignition switch 112, to a wire 113, thence through solenoid 48 to a terminal 114 from which either of two parallel grounds 115 or 116 will complete a circuit to energize solenoid 48 through wires 117 or 118 respectively.

The relation of the governor 51 to the system may be explained by an example. When manual clutch C of Fig. 2 is locking gear 28 to shaft 21 for normal driving in third or fourth forward speeds and the engine is idling with switch 50 closed and switch 52 open, solenoid 48 is energized and valve F closed. Therefore, sleeve A is not engaged with transmission teeth 24 and operation will be in the third speed gear explained above driving directly from pinion 23 through countershaft cluster 19 and gear 28. The fluid coupling 11 will permit the vehicle to remain stationary while the engine is idling. When the throttle is opened slightly the vehicle will be driven forward. When sufficient vehicle speed is obtained switch 50 is opened by governor 51 and solenoid 48 is deenergized. Spring 49 will open valve F and oil under pressure will be permitted to enter passage 43 and move piston 39 to the left thereby urging sleeve A to the left in Fig. 2 although it is restrained by blocker 16. When synchronous speeds through blocker device 26 and a reduction of engine speed initiated by the driver permit engagement of teeth 24 with sleeve A the vehicle is geared for drive in fourth speed when engine speed is increased.

Governor 51 also initiates a transmission downshift when vehicle speed is reduced sufficiently to cause the governor to close switch 50. This energizes solenoid 48, closes valve F, vents servo motor D and permits spring 41 to move piston 39 to the right momentarily interrupting engine ignition and through spring 41 and yoke 38 disengaging sleeve A from gear teeth 24 and causing drive to be in third speed as described above.

The function of switch 52 is to provide means for a downshift from fourth speed to third speed or if manual clutch C is in the low speed range position from second speed to first speed. When the vehicle is travelling in fourth speed with switches 50 and 52 open and for example, a steep hill is encountered, the driver may push accelerator pedal 55 to its extreme down position. Tooth 57 on arm 56 will close switch 52, ground the solenoid circuit at 116, thereby energizing solenoid 48 and by means of the venting of oil pressure from servo motor D and the action of spring 41 move piston 39, interrupt engine ignition by switch E and move yoke 38, and sleeve A to the right thereby creating the conditions necessary for third speed drive described above.

Means have been provided in the system at G and H to overcome the tendency of the engine to stall when idling by automatically actuating the throttle 54 slightly when the manifold pressure drops and delaying the closing of the throttle to allow time for engine recovery. A device to perform this function is described in Patent No. 2,205,458 issued June 25, 1940, to T. M. Ball. My present invention relates to an improvement in this throttle control. Devices of the type described by Patent No. 2,205,458 delay the retarding of the throttle. I have provided means for automatically eliminating the delay in throttle closing at predetermined speeds in excess of idling engine speeds and under all conditions when a transmission upshift might be required.

In Fig. 3 throttle valve 54 is keyed to shaft 58 which is fixed to lever 59. Lever 59 is rotated by linkage 70, 56, 71 connecting it to accelerator foot pedal 55. Suction tube 61 is connected to the intake manifold. When the engine is idling lever 59 and throttle valve 54 are rotated clockwise by spring 72 until lever 59 engages the end of adjustable screw 73. Rod 74 is slidably mounted in boss 75 and in engagement with abutment face 60 of lever 59. The opposite end of rod 74 is pivotally connected to the lower arm of a bellcrank lever 76. The opposite arm of lever 76 is urged against the lower side of a diaphragm 77 by spring 78. Diaphragm 77 is one wall of chamber G. A spring 79 reacts against diaphragm 77. Suction tube 80 in conjunction with tube 61 connects chamber G to the intake manifold. In operation when the engine is running, a suction is created in chamber G from the intake manifold. The differential in air pressure overcomes spring 79 and keeps diaphragm 77 at its upward limit. When the engine begins to stall and the manifold ceases to create a low pressure, spring 79 extends diaphragm 77, overcomes spring 78 and through lever 76, extends rod 74 thereby urging throttle 54 through lever 59 to a more open position. Lever 59 is restrained at 60 from sufficient clockwise rotation to engage stop 73.

In order to cause the engine to maintain its increased speed for a time sufficient to insure continued operation, a dashpot delay device H is provided. Suction tube 80 is connected to passage 81 of housing 82. Suction tube 61 is connected to passage 83. Passages 81 and 83 are connected by orifice 84. A small ball 85 is adapted to seal orifice 84 when sufficient suction is present in passage 83. Pin 86 holds ball 85 in the vicinity of orifice 84. A leak passage 87 connects passages 81 and 83. When the engine begins to stall, manifold absolute pressure increases permitting spring 79 through diaphragm 77, lever 76, rod 74 and lever 59 to prevent a normal closing of the throttle. This open position of the throttle permits the engine to recover and thereby resumes suction in tube 61 and passage 83 causing ball 85 to seal orifice 84. Leak passage 87 has a small area and permits only a very gradual resumption of suction in passage 81, tube 80, and chamber G. Therefore, the return of diaphragm 77 to its upward position and closing of the throttle by spring 72 is retarded.

I have provided means to eliminate the effect of dashpot device H when governor 51 opens switch 50. Solenoid 100 when energized holds plunger 101 up and out of orifice 84. Spring 102 urges plunger 101 into orifice 84 which prevents the seating of ball 85 over orifice 84 and leaves a large free passage for suction to reach diaphragm 77. Therefore, at low vehicle speeds when governor 51 permits switch 50 to be closed and solenoid 100 to be energized the dashpot action is as described in the preceding paragraph. At higher vehicle speeds the solenoid is deenergized by the opening of switch 50 and spring 102 causes plunger 101 to prevent the seating of ball 85 thereby permitting a quick closing of the throttle to occur.

Fig. 4 illustrates a modified form of my invention wherein oil pressure from pump 44 is utilized instead of solenoid 100. Chamber 105 contains diaphragm 106 and oil inlet 103 and small oil inlet 104. Oil inlet 103 is connected by a T connection or similar means to tube 43 of Fig. 3. Oil outlet 104 returns to supply 46.

When the engine is idling, solenoid 48 is energized and valve F closed. If the engine should tend to stall at this time there is no oil pressure in chamber 105 and spring 108 is lifting rod 101ª leaving ball 85ª unobstructed and able to seat in orifice 84ª as explained above when the engine recovers and manifold suction is restored. Leak passage 87ª permits only a gradual resumption of suction and a delayed closing of the throttle. When the engine is operating at faster speeds governor 51 opens switch 50 which deenergizes solenoid 48 and spring 49 opens valve F. Oil pressure from valve F enters chamber 105 extending the diaphragm 106 and causing rod 101ª to prevent ball 85ª from sealing orifice 84ª. Therefore, suction can be quickly restored above diaphragm 106 and throttle valve 54 can immediately close.

In Fig. 5 a modified form of solenoid control is illustrated. Suction tube 80 leading from the chamber G described above is connected to delay device J. Suction tube 61 connects delay device J to the intake manifold. Delay device J contains a large orifice 131 and a small bleed orifice 132. Plug 133 is adapted to seal orifice 131 when a solenoid 130 is energized. A spring 134 lifts plug 133 out of orifice 131 when solenoid 130 is not energized. Therefore, at low speeds when solenoid 130 is energized orifice 131 is closed and if the manifold suction should drop thereby permitting the spring 79 through diaphragm 77, bell crank 76, levers 74 and 59 to hold the throttle partially open the restoration of low pressure in chamber G is delayed by the small size of orifice 132. At higher speeds when solenoid 130 is deenergized and in the Fig. 5 position orifice 131 is open and the restoration of a differential pressure between the inside and outside of chamber G is unrestricted and the throttle closing is not retarded.

Fig. 5 also differs from Fig. 3 in that an optional governor 120 which is engine speed responsive rather than vehicle speed responsive as governor 51 has been illustrated as controlling the energization of solenoid 130. The entire Figure 3 has not been reproduced but all parts other than these shown are similar. The governor 120 suitably driven at 121 from some moving part of the engine such as shaft 20 is illustrated in Fig. 5. In this illustration the operation of solenoid 48 and ignition interrupter switch E would be unaffected, but solenoid 130 could be grounded at 124 when switch 125 is closed. However, with governor 120 set to open switch 125 above a predetermined engine speed solenoid 100 would be deenergized when switch 125 opened. It is optional with the user to install my invention so that it is either engine speed responsive or vehicle speed responsive.

In the throttle control device described herein to prevent engine stalling the mechanism for inactivating it during the time that its operation would be disadvantageous may be controlled by a medium such as a governor which will render the device operative or inoperative under different conditions encountered in the operation of the vehicle. A selection of the desired controlling condition will determine the type of drive to be used for the medium.

I claim:

1. In an internal combustion engine having a throttle adapted for opening and closing movements, the combination of a device sensitive to change in manifold pressure adapted to open the throttle when said engine begins to stall and to temporarily hold said throttle open to facilitate engine recovery, and automatic means responsive to predetermined vehicle operating conditions to selectively render said device operative and inoperative.

2. In an internal combustion engine having an intake manifold and a throttle adapted for opening and closing movements, the combination of a device activated by decrease in manifold suction for retarding the closing of the throttle, restrictive means for delaying the inactivation of said device when manifold suction is restored, and means to selectively render said restrictive means operative and inoperative.

3. In an internal combustion engine having a throttle adapted for opening and closing movements, the combination of an intake manifold, spring means to open said throttle, suction operated means adapted to inactivate said spring means when exposed to normal manifold suction whereby said spring means operates only when manifold suction decreases incident to radical decrease in engine speed, restrictive means for delaying the reactivation of said suction operated means incident to increased engine speed, and means for by-passing said restrictive means.

4. In an internal combustion engine having a throttle adapted for opening and closing movements, the combination of a manifold pressure responsive device adapted to retard the closing of the throttle when said engine begins to stall, and electromagnetically controlled means to render said device inoperative.

5. In an internal combustion engine having a throttle adapted for opening and closing movements under the control of an operator, manifold pressure responsive means to retard the closing of said throttle, and control mechanism including a solenoid operated apparatus to render said pressure responsive means inoperative in response to predetermined vehicle operating conditions.

6. In an internal combustion engine having a throttle adapted for opening and closing movements, the combination of a device sensitive to change in manifold pressure adapted to open the throttle when said engine begins to stall and to temporarily hold said throttle open to facilitate engine recovery, and control mechanism including a solenoid operated apparatus to render said device inoperative in response to predetermined vehicle operating conditions.

7. In an internal combustion engine having an intake manifold and a throttle adapted for opening and closing movements, manifold pressure responsive means adapted to retard the closing of said throttle, said means being activated by decrease of manifold suction, an air passage connecting said means and said manifold, a second means to partially obstruct said passage when manifold suction increases, and means to maintain said passage unobstructed under all conditions above a predetermined engine speed.

8. In a motor vehicle drive comprising an engine having an intake manifold and a throttle adapted for opening and closing movements, manifold pressure responsive means adapted to retard the closing of said throttle, said means being activated by decrease of manifold suction, an air passage connecting said means and said manifold, a second means to partially obstruct said passage when manifold suction increases, and means to maintain said passage unobstructed under all conditions above a predetermined vehicle speed.

9. In an internal combustion engine having an intake manifold and a throttle adapted for opening and closing movements, the combination of a device activated by decrease in manifold suction for retarding the closing of the throttle, restrictive means for delaying the inactivation of said device when manifold suction is restored, and means to render inoperative said restrictive means above a predetermined engine speed.

10. In a motor vehicle drive comprising an engine having a manifold and a throttle adapted for opening and closing movements, the combination of a device activated by decrease in manifold suction for retarding the closing of the throttle, restrictive means for delaying the inactivation of said device when manifold suction is restored, and means to render inoperative said restrictive means above a predetermined vehicle speed.

11. In an internal combustion engine having a throttle adapted for opening and closing movements, the combination of a manifold pressure responsive device adapted to retard the closing of the throttle when said engine begins to stall, a solenoid, an electric circuit connected to said solenoid, means to temporarily maintain said throttle partially open to facilitate engine recovery, the operation of said means being contingent upon the operation of said solenoid, a switch in the electric circuit, and a governor adapted to open said switch above a predetermined engine speed.

12. In a motor vehicle drive comprising an engine having a throttle adapted for opening and closing movements, the combination of a manifold pressure responsive device adapted to retard the closing of the throttle when said engine begins to stall, a solenoid, an electric circuit connected to said solenoid, means to temporarily maintain said throttle partially open to facilitate engine recovery, the operation of said means being contingent upon the operation of said solenoid, a switch in the electric circuit, and a governor adapted to open said switch above a predetermined vehicle speed.

13. In a motor vehicle drive comprising an engine having a throttle adapted for opening and closing movements, the combination of an intake manifold, spring means to open said throttle, suction operated means adapted to inactivate said spring means when exposed to normal manifold suction whereby said spring means operates only when manifold suction decreases incident to radical decrease in engine speed, restrictive means for delaying the reactivation of said suction operated means incident to increased engine speed, and means for by-passing said restrictive means above a predetermined vehicle speed.

14. In an internal combustion engine having a throttle adapted for opening and closing movements, the combination of an intake manifold, spring means to open said throttle, suction operated means adapted to inactivate said spring means when exposed to normal manifold suction whereby said spring means operates only when manifold suction decreases incident to radical decrease in engine speed, restrictive means for delaying the reactivation of said suction operated means incident to increased engine speed, and means for by-passing said restrictive means above a predetermined engine speed.

15. In a drive for a motor vehicle having an internal combustion engine provided with a throttle adapted for opening and closing movements, the combination of a transmission, means to automatically upshift the speed ratio in said transmission under synchronous conditions of driving and driven transmission elements above a predetermined vehicle speed, a first apparatus actuated by increasing manifold absolute pressure incident to decrease in engine speed, said first apparatus being adapted to retard the closing of the throttle of the engine and to temporarily maintain said throttle open to facilitate engine recovery, and control apparatus operable to render said first apparatus inoperative above said predetermined vehicle speed.

16. In a motor vehicle having an internal combustion engine provided with a throttle adapted for opening and closing movements, the combination of a transmission, means to automatically upshift the speed ratio in said transmission under synchronous conditions of driving and driven transmission elements above a predetermined vehicle speed, a first apparatus actuated by increasing manifold absolute pressure incident to decrease in engine speed, said first apparatus being adapted to retard the closing of the throttle of the engine and to temporarily maintain said throttle open to facilitate engine recovery, and control apparatus operable to render said first apparatus inoperative during the time said upshift occurs.

17. In a drive for a motor vehicle having an internal combustion engine provided with a throttle adapted for opening and closing movements, the combination of a transmission, means to automatically upshift the speed ratio in said transmission under synchronous conditions of driving and driven transmission elements above a predetermined vehicle speed, a first apparatus actuated by increasing manifold absolute pressure incident to decrease in engine speed, said first apparatus being adapted to retard the closing of the throttle of the engine and to temporarily maintain said throttle open to facilitate engine recovery, and control apparatus operable to render said first apparatus inoperative above said predetermined engine speed.

18. In a drive for a motor vehicle having an internal combustion engine provided with a throttle, the combination of a variable speed ratio transmission, change-speed control means operable in response to retardation of engine speed when above a predetermined vehicle speed to control operation of said transmission, manifold pressure responsive means to retard the closing of said throttle, and means to render said pressure responsive means inoperative during the time said change-speed control means is functioning.

19. In a drive for a motor vehicle having an internal combustion engine provided with a throttle adapted for opening and closing movements, the combination of a variable speed ratio transmission comprising means operable to effect change in the speed ratio drive between the engine and vehicle, change-speed control means operable in response to retardation of engine speed when above a predetermined vehicle speed to control operation of said transmission, manifold pressure responsive means to retard the closing of said throttle, said pressure responsive means being activated by decrease of manifold suction, an air passage connecting said pressure responsive means and said manifold, a third means to partially obstruct said passage when manifold suction increases, and means to maintain said passage unobstructed during the time said change-speed control means is functioning.

20. In a drive for a motor vehicle having an internal combustion engine provided with a throttle adapted for opening and closing movements, the combination of a variable speed ratio transmission comprising means operable to effect change in the speed ratio drive between the engine and vehicle, change-speed control means operable in response to retardation of engine speed when above a predetermined vehicle speed to control operation of said transmission, manifold pressure responsive means to retard the closing of said throttle, said pressure responsive means being activated by decrease of manifold suction, an air passage connecting said pressure responsive means and said manifold, a third means to partially obstruct said passage when manifold suction increases, and means to maintain said passage unobstructed under all conditions above said predetermined vehicle speed.

21. In a drive for a motor vehicle having an internal combustion engine provided with a throttle adapted for opening and closing movements, the combination of a variable speed ratio transmission comprising means operable to effect change in the speed ratio drive between the engine and vehicle, change-speed control means operable in response to retardation of engine speed when above a predetermined vehicle speed to control operation of said transmission, manifold pressure responsive means to retard the closing of said throttle, said pressure responsive means being activated by decrease of manifold suction, an air passage connecting said pressure responsive means and said manifold, a third means to partially obstruct said passage when manifold suction increases, and means to maintain said passage unobstructed under all conditions above a predetermined engine speed.

22. In a drive for a motor vehicle having an internal combustion engine provided with a throttle adapted for opening and closing movements, the combination of a variable speed ratio transmission comprising means operable to effect change in the speed ratio drive between the engine and vehicle, change-speed control means operable in response to retardation of engine speed when above a predetermined vehicle speed to control operation of said transmission, a device activated by decrease in manifold suction for opening the throttle, restrictive means for delaying the inactivation of said device when manifold suction is restored and means to render inoperative said restrictive means during the time said change speed control means is functioning.

23. In a drive for a motor vehicle having an internal combustion engine provided with a throttle adapted for opening and closing movements, the combination of a variable speed ratio transmission comprising means operable to effect change in the speed ratio drive between the engine and vehicle, change-speed control means operable in response to retardation of engine speed when above a predetermined vehicle speed to control operation of said transmission, a device activated by decrease in manifold suction for opening the throttle, restrictive means for delaying the inactivation of said device when manifold suction is restored and means to render inoperative said restrictive means above a predetermined vehicle speed.

24. In a drive for a motor vehicle having an internal combustion engine provided with a throttle adapted for opening and closing movements, the combination of a variable speed ratio transmission comprising means operable to effect change in the speed ratio drive between the engine and vehicle, change-speed control means operable in response to retardation of engine speed when above a predetermined vehicle speed to control operation of said transmission, a device activated by decrease in manifold suction for opening the throttle, restrictive means for delaying the inactivation of said device when manifold suction is restored and means to render inoperative said restrictive means above a predetermined engine speed.

25. In a drive for a motor vehicle having an internal combustion engine provided with a throttle adapted for opening and closing movements, the combination of a variable speed ratio transmission comprising means operable to effect change in the speed ratio drive between the engine and vehicle, change-speed control means operable in response to retardation of engine speed when above a predetermined vehicle speed to control operation of said transmission, spring means to open said throttle, suction operated means adapted to inactivate said spring means when exposed to normal manifold suction whereby said spring means operates only when manifold suction decreases incident to radical decrease in engine speed, restrictive means for delaying the reactivation of said suction operated means incident to increased engine speed, and means for by-passing said restrictive means during the time said change speed control means is functioning.

26. In a drive for a motor vehicle having an internal combustion engine provided with a throttle adapted for opening and closing movements, the combination of a variable speed ratio transmission comprising means operable to effect change in the speed ratio drive between the engine and vehicle, change-speed control means operable in response to retardation of engine speed when above a predetermined vehicle speed to control operation of said transmission, spring means to open said throttle, suction operated means adapted to inactivate said spring means when exposed to normal manifold suction whereby said spring means operates only when manifold suction decreases incident to radical decrease in engine speed, restrictive means for delaying the reactivation of said suction operated means incident to increased engine speed, and means for by-passing said restrictive means above a predetermined vehicle speed.

27. In a drive for a motor vehicle having an internal combustion engine provided with a throttle adapted for opening and closing movements, the combination of a variable speed ratio transmission comprising means operable to effect change in the speed ratio drive between the engine and vehicle, change-speed control means operable in response to retardation of engine speed when above a predetermined vehicle speed to control operation of said transmission, spring means to open said throttle, suction operated means adapted to inactivate said spring means when exposed to normal manifold suction whereby said spring means operates only when manifold suction decreases incident to radical decrease in engine speed, restrictive means for delaying the reactivation of said suction operated means incident to increased engine speed, and means for by-passing said restrictive means above a predetermined engine speed.

28. In a drive for a motor vehicle having an internal combustion engine provided with a throttle adapted for opening and closing movements, the combination of a variable speed ratio transmission comprising means operable to effect change in the speed ratio drive between engine and vehicle, hydraulically actuated change speed control means operable in response to retardation of engine speed when above a predetermined vehicle speed to control operation of said transmission, a device activated by decrease in manifold suction for retarding the closing of the throttle, restrictive means for delaying the inactivation of said device when manifold suction is restored and a hydraulically controlled device activated by said hydraulically actuated change speed control means to render inoperative said restrictive means.

29. In a drive for a motor vehicle having an engine provided with a throttle adapted for opening and closing movements, slip-drive means for transmitting drive from the engine to the vehicle, manifold pressure responsive means to retard the closing of said throttle thereby to prevent stalling of the engine, control means permitting said pressure responsive means to function at relatively low engine speeds, giving rise to engine stalling tendency but not permitting said pressure responsive means to function at relatively high engine speeds free from engine stalling tendency.

30. A control device for internal combustion engines having fuel intake means of the type including a carburetor throttle valve for regulating the amount of combustible fuel mixture fed to the cylinders of the engine, said device comprising pressure differential operated means controlled by the difference in pressure between the interior and exterior of the fuel intake means for opening the throttle valve if the engine tends to stall while idling, said pressure differential operated means comprising mechanism for moving the throttle valve to open position and intake suction responsive means for overcoming said mechanism, a dashpot device for delaying the operation of said intake suction responsive means and control apparatus operable in response to predetermined vehicle operating conditions to selectively render said dashpot device inoperable.

31. A device for an internal combustion engine having a carburetor throttle valve for regulating the amount of combustible fuel mixture fed to the cylinders of the engine, said device comprising a movable element, spring means operable to move said element in a first direction, means cooperating with said element to define an air chamber located on one side of said element, the volumetric capacity of said chamber being controlled by movement of said element, mechanism operatively connecting said element and said throttle valve such that movement of said throttle valve to its closed position necessitates movement of said element in a direction opposite to said first direction, means forming a fluid passage to said chamber to control the flow of air between said chamber and the exterior thereof, a one-way valve in said passage operable to readily admit air to said chamber and obstruct the discharge of air from said chamber, means forming a supplemental restricted passage operable to by-pass said valve and accommodate a limited flow of air from said chamber to accommodate a retarded movement of said throttle toward its closed position and control mechanism including a solenoid operated apparatus to open said one-way valve in response to predetermined vehicle operating conditions to render said device inoperative under said conditions.

THOMAS M. BALL.

REFERENCES CITED

The following references are of record in the file of this patent:

UNITED STATES PATENTS

| Number | Name | Date |
|---|---|---|
| 1,833,908 | Maybach | Dec. 1, 1931 |
| 2,005,262 | Liverance | June 18, 1935 |
| 2,101,605 | Winfield | Dec. 7, 1937 |
| 2,107,314 | Vanderpoel | Feb. 8, 1938 |
| 2,131,950 | High | Oct. 4, 1938 |
| 2,157,472 | Bellis | May 9, 1939 |
| 2,205,458 | Ball | June 25, 1940 |
| 2,296,646 | Matulaitis | Sept. 22, 1942 |
| 2,314,570 | Ball | Mar. 23, 1943 |
| 2,362,655 | Mallory | Nov. 14, 1944 |